United States Patent
Ajima et al.

(10) Patent No.: US 9,610,972 B2
(45) Date of Patent: Apr. 4, 2017

(54) INVERTER DEVICE

(71) Applicant: Hitachi Automotive Systems, Ltd., Hitachinaka-shi, Ibaraki (JP)

(72) Inventors: Toshiyuki Ajima, Tokyo (JP); Kimihisa Furukawa, Tokyo (JP); Tohma Yamaguchi, Hitachinaka (JP); Hiroki Takeda, Hitachinaka (JP)

(73) Assignee: HITACHI AUTOMOTIVE SYSTEMS, LTD., Ibaraki (JP)

(*) Notice: Subject to any disclaimer, the term of this patent is extended or adjusted under 35 U.S.C. 154(b) by 11 days.

(21) Appl. No.: 14/688,795

(22) Filed: Apr. 16, 2015

(65) Prior Publication Data
US 2015/0303844 A1  Oct. 22, 2015

(30) Foreign Application Priority Data
Apr. 18, 2014 (JP) .................. 2014-086095

(51) Int. Cl.
| H03K 5/00 | (2006.01) |
| H02P 21/00 | (2016.01) |
| B62D 5/04 | (2006.01) |
| H02P 21/14 | (2016.01) |
| H02M 7/5395 | (2006.01) |
| H02M 1/00 | (2006.01) |

(52) U.S. Cl.
CPC .......... *B62D 5/046* (2013.01); *H02M 7/5395* (2013.01); *H02P 21/14* (2013.01); *B62D 5/0463* (2013.01); *H02M 2001/0009* (2013.01)

(58) Field of Classification Search
CPC ........ H02P 6/10; H02P 23/14; H02P 21/0035; H02P 6/142; H02P 6/002; H02P 21/14; B62D 5/046; B62D 5/0463; H02M 7/5395; H02M 2001/0009
USPC .......................................... 318/400.02, 400.13
See application file for complete search history.

(56) References Cited

U.S. PATENT DOCUMENTS

| 2007/0013333 A1* | 1/2007 | Ajima | .................. H02P 6/18 318/432 |
| 2014/0176027 A1* | 6/2014 | Osaki | ................ H02P 6/002 318/400.2 |
| 2015/0077025 A1* | 3/2015 | Suzuki | ............... B62D 5/0463 318/400.02 |

FOREIGN PATENT DOCUMENTS

| JP | 11-004594 A | 1/1999 |
| JP | 3843391 B2 | 8/2006 |
| JP | 5069882 B2 | 8/2012 |

* cited by examiner

*Primary Examiner* — Bentsu Ro
*Assistant Examiner* — Zemenay Truneh
(74) *Attorney, Agent, or Firm* — Volpe and Koenig, P.C.

(57) ABSTRACT

An inverter device includes a source current calculator and an inverter circuit, wherein: the source current calculator calculates an average value of the DC bus current Ical during a PWM cycle through arithmetic operation executed based upon instantaneous values of the DC bus current Idc of the inverter circuit; and the source current calculator provides an estimated value by designating the average current value Ical during the PWM cycle as an input source current Isrc during the PWM cycle.

3 Claims, 10 Drawing Sheets

FIG.2A
| VOLTAGE VECTOR | PWM PATTERN (U, V, W) | MOTOR CURRENT | DC CURRENT |
|---|---|---|---|
| V0 | (0, 0, 0) | 0=Iu+Iv+Iw | 0 |
| V1 | (1, 0, 0) | Iu=−(Iv+Iw) | Iu |
| V2 | (1, 1, 0) | −Iw=Iu+Iv | −Iw |
| V3 | (0, 1, 0) | Iv=−(Iu+Iw) | Iv |
| V4 | (0, 1, 1) | −Iu=Iv+Iw | −Iu |
| V5 | (0, 0, 1) | Iw=−(Iu+Iv) | Iw |
| V6 | (1, 0, 1) | −Iv=Iu+Iw | −Iv |
| V7 | (1, 1, 1) | 0=Iu+Iv+Iw | 0 |
FIG.2B
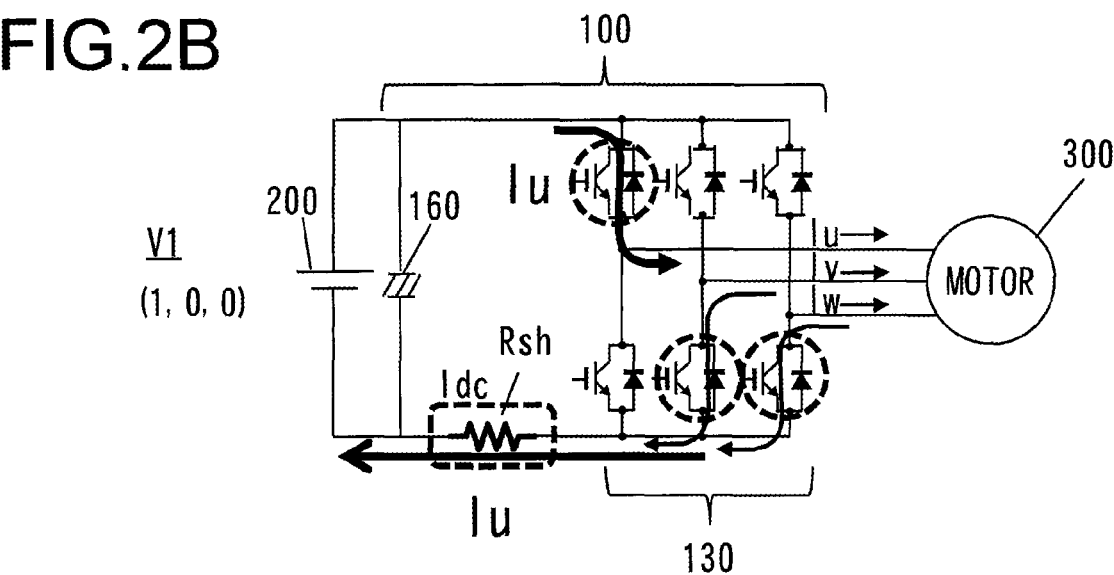
FIG.2C
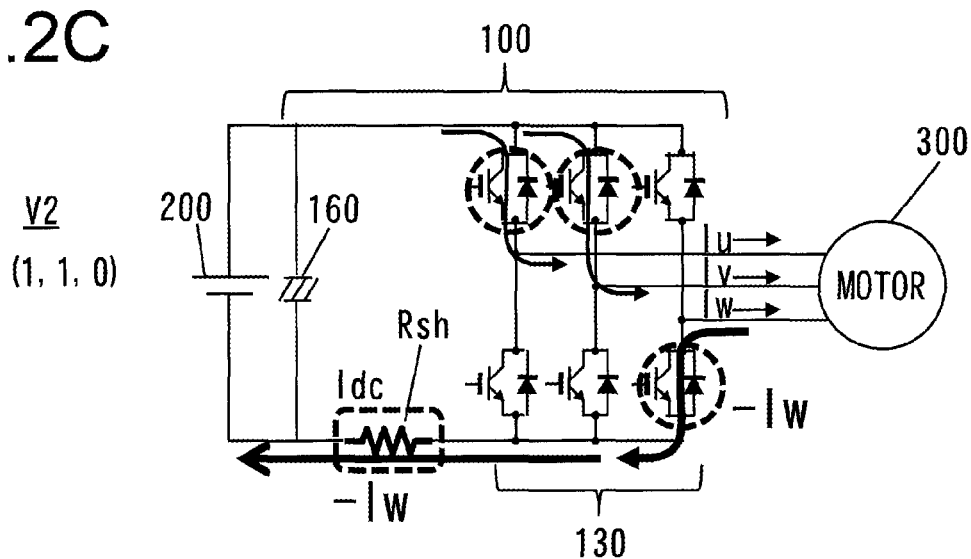

INVERTER DEVICE

INCORPORATION BY REFERENCE

The disclosure of the following priority application is herein incorporated by reference: Japanese Patent Application No. 2014-086095 filed Apr. 18, 2014

BACKGROUND OF THE INVENTION

1. Field of the Invention

The present invention relates to an inverter device.

2. Description of Related Art

In an inverter device that includes an inverter via which a motor is driven, the current value of a current flowing on the source side (will hereafter be referred to as an input source current) relative to the smoothing capacitor is obtained either by detecting the input source current with a current sensor or by estimating an input source current based upon the value detected for the electric current flowing on the inverter circuit side relative to the smoothing capacitor, i.e., based upon the detection value obtained for the inverter DC bus current (hereafter will be simply referred to as a DC bus current) without utilizing a current sensor.

Japanese Patent No. 5069882 discloses an invention that enables detection of the input source current (note that the term "bus DC current in the converter circuit" is used to refer to this current in the above identified patent). However, the addition of a current sensor via which the input source current is detected is bound to lead to an increase in production costs as well as an increase in the amount of installation space required.

In order to address the issues discussed above, Japanese Patent No. 3843391, for instance, discloses an invention pertaining to an art whereby an input source current is estimated, instead of detecting the input source current via a current sensor, by detecting the DC bus current and filtering the detection signal indicating the detected DC bus current and the motor is controlled based upon the estimated input source current.

An ample sampling period over which the DC bus current is sampled must be assured in order to enable detection of the DC bus current.

Japanese Laid Open Patent Publication No. H11-004594 describes a method for assuring a sufficient DC bus current sampling period when detecting PWM pulses at an inverter device and a pulse DC bus current flowing into an inverter under conditions in which the signal difference (the pulse width of a line voltage) between the PWM pulses corresponding to at least two phases among the three phases is less than a predetermined time length by increasing the signal difference between the PWM pulses (the pulse width of the line voltage) so as to achieve the required line voltage pulse width (hereafter the method will be simply referred to as a pulse shift method).

However, when the pulse shift method described above is adopted in the invention disclosed in Japanese Patent No. 3843391, a problem arises in that the extent of current ripple in the DC bus current having undergone filter processing increases.

SUMMARY OF INVENTION

An inverter device that allows the input source current to be estimated with a high level of accuracy even in conjunction with the pulse shift method without having to use a current sensor for input source current detection has been actively pursued.

An inverter device according to the present invention, comprises: a positive pole-side terminal connected to a positive pole side of a power source; a negative pole-side terminal connected to a negative pole side of the power source; a three-phase inverter circuit connected to a motor to drive the motor; a smoothing capacitor; a positive pole-side connection point that electrically connects the positive pole-side terminal, the inverter circuit and the smoothing capacitor; a negative pole-side connection point that electrically connects the negative pole-side terminal, the inverter circuit and the smoothing capacitor; a PWM generator that generates three-phase PWM waves used to drive the inverter circuit; a pulse shift unit that generates, based upon the PWM waves, a first command in response to which the PWM generator executes a pulse shift or a second command in response to which the PWM generator does not execute a pulse shift; a current detector that detects a DC bus current that flows between the positive pole-side connection point and the inverter circuit or between the negative pole-side connection point and the inverter circuit as the inverter circuit is driven; an arithmetic operation unit that calculates an average value of the DC bus current during a PWM cycle through arithmetic operation executed based upon instantaneous values of the DC bus current detected at predetermined time points occurring during continuous output periods corresponding to predetermined voltage vectors within the PWM cycle; and an input source current estimating unit that provides an estimated value for an input source current flowing between the positive pole-side terminal and the positive pole-side connection point or between the negative pole-side terminal and the negative pole-side connection point during the PWM cycle by designating the average value of the DC bus current flowing through the PWM cycle as the estimated value.

BRIEF DESCRIPTION OF THE DRAWINGS

FIGS. 2A through 2C indicate the relationship among the DC bus current and the motor currents as observed in a first embodiment.

DESCRIPTION OF EMBODIMENTS

—First Embodiment—

Figure 1:
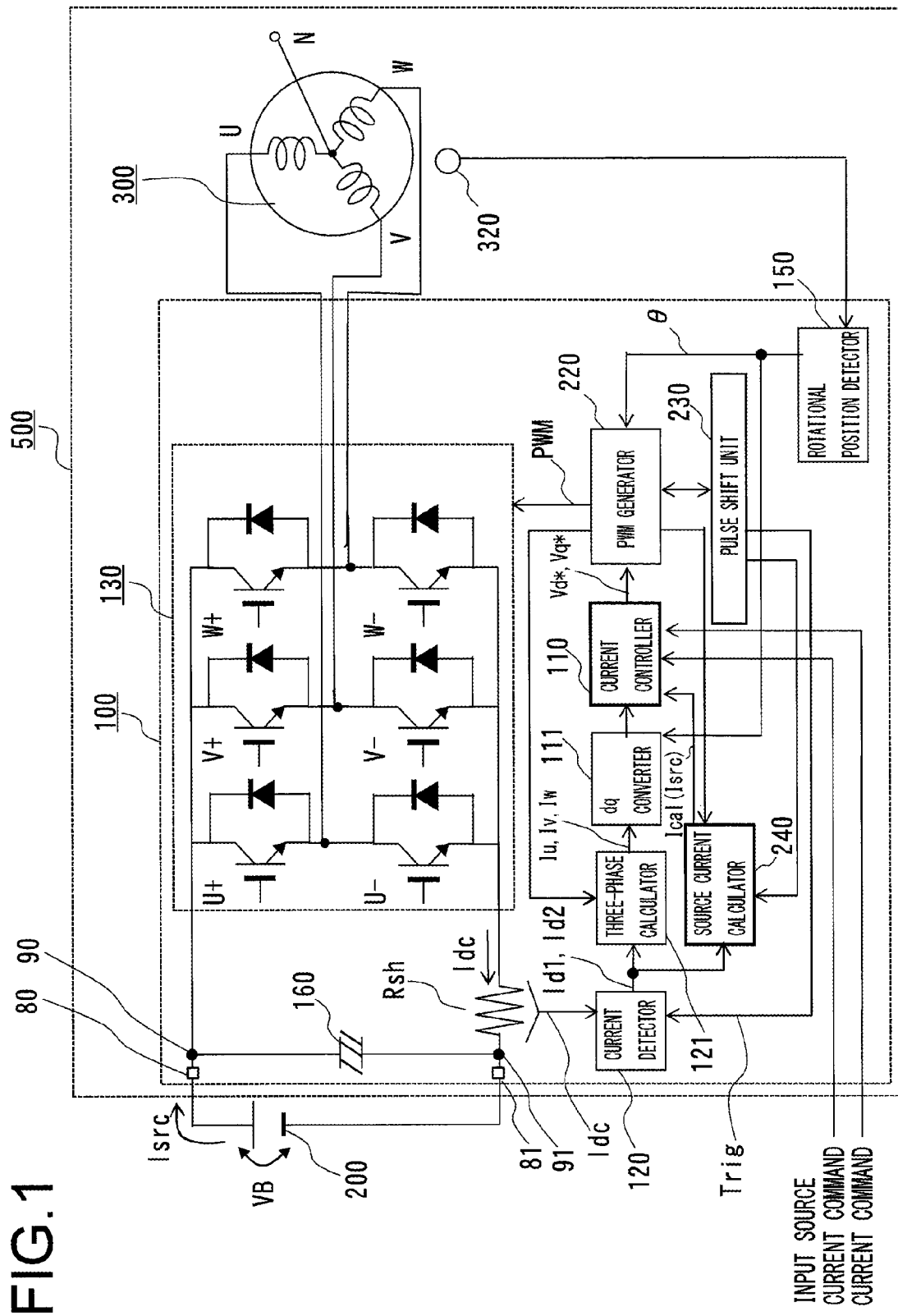
FIG. 1 is a block diagram showing the structure adopted in relation to the inverter device and the like according to the present invention.

FIG. 1 is a block diagram showing the structure related to the inverter device according to the present invention and elements present in its vicinity.

A motor system 500 is suitable for use in applications in which a motor is driven with high efficiency by shifting PWM wave pulses in an inverter device in correspondence to the motor output and thus improving the accuracy with which the DC bus current at the inverter circuit is detected. The motor system 500 includes a motor 300 and an inverter device 100.

The inverter device 100 comprises an inverter circuit 130, a shunt resistor Rsh via which the DC bus current in the inverter circuit 130 is detected, a current detector 120, a pulse shift unit 230, a source current calculator 240, a three-phase calculator 121, a dq converter 111, a current controller 110, a PWM generator 220, a rotational position detector 150, a smoothing capacitor 160, a positive pole-side terminal 80, a negative pole-side terminal 81, a positive pole-side connection point 90 and a negative pole-side connection point 91. The positive pole-side connection point 90 connects the positive pole-side terminal 80, the smoothing capacitor 160 and the inverter circuit 130. The negative pole-side connection point 91 connects the negative pole-side terminal 81, the smoothing capacitor 160 and the inverter circuit 130.

A battery 200 is a DC voltage source for the inverter device 100. The positive electrode of the battery 200 is connected to the inverter device 100 via the positive pole-side terminal 80. In addition, the negative electrode of the battery 200 is connected to the inverter device 100 via the negative pole-side terminal 81. A DC voltage VB at the battery 200 is converted to three-phase AC power with a variable voltage and a variable frequency via the inverter circuit 130, and the three-phase AC power resulting from the conversion is then applied to the motor 300.

The motor 300 is a synchronous motor rotationally driven with the three-phase AC power supplied thereto. A rotational position sensor 320 is installed at the motor 300 so as to enable control of the phases of the three-phase AC voltage applied thereto in correspondence to the phases of the voltage induced in the motor 300. The rotational position detector 150 calculates, through arithmetic operation, a detected position θ based upon a signal input thereto from the rotational position sensor 320 and also calculates a rotation speed ωr. While it is more desirable to configure the rotational position sensor 320 used for these purposes with a resolver constituted with cores and windings, the present invention may be adopted in conjunction with a rotational position sensor constituted with a GMR sensor or a Hall element, as well.

The inverter device 100 has a current control function that enables it to control the output of the motor 300 and detects a pulse DC bus current flowing into the inverter circuit 130 as current (DC bus current Idc) flowing through the shunt resistor Rsh inserted between the smoothing capacitor 160 and the inverter circuit 130. While the shunt resistor Rsh is mounted on the negative pole side of the battery 200 in this example, it may instead be mounted on the positive pole side of the battery 200.

Figure 4:
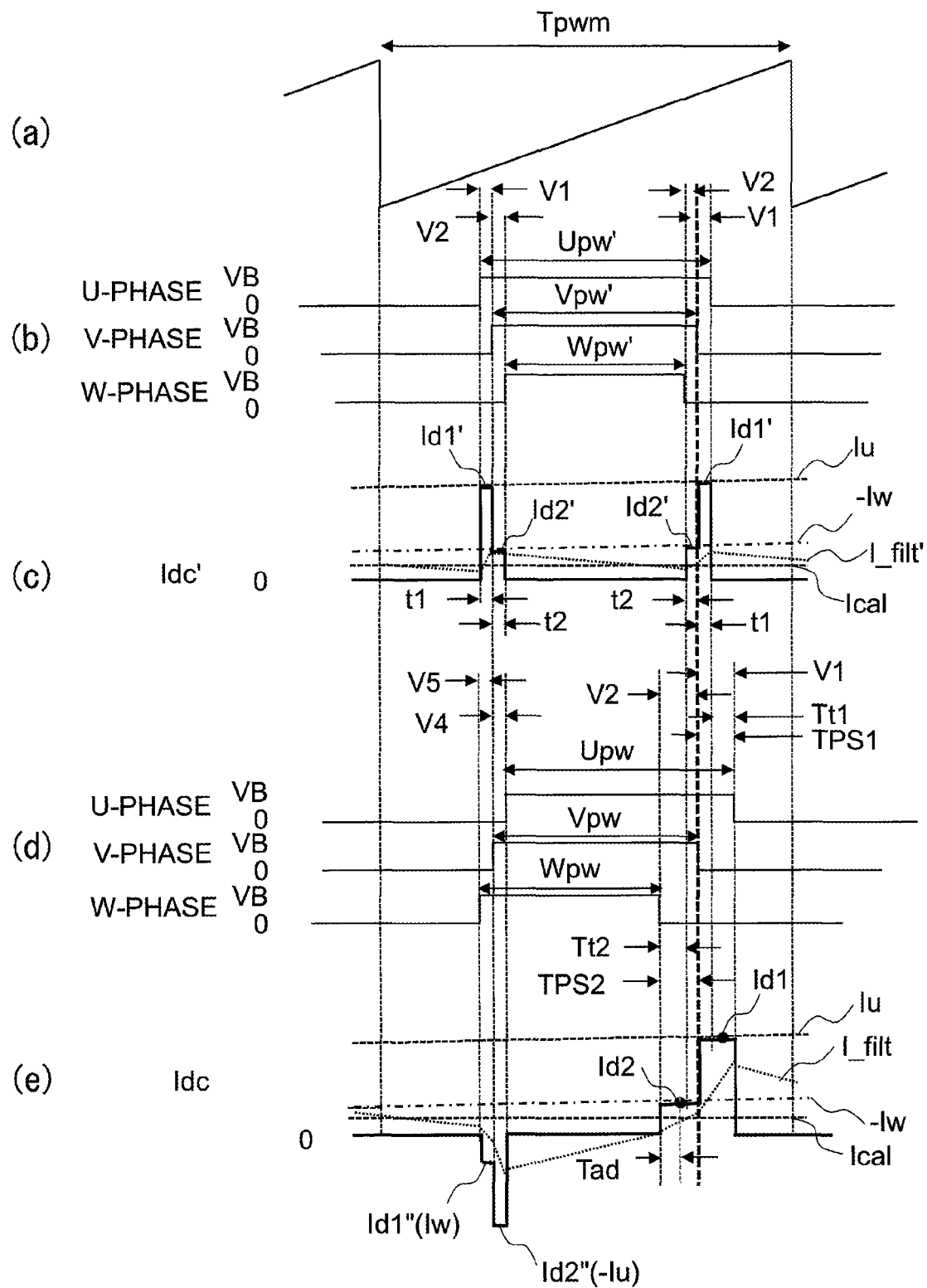
FIG. 4 is a waveform diagram indicating how the pulse shift operation is executed in the first embodiment.

The current detector 120 detects at least two detection values (Id1, Id2) as DC bus current values during a single PWM cycle with trigger timing Trig generated by the pulse shift unit 230 (see FIG. 1 and FIG. 4).

The three-phase calculator 121 estimates three-phase motor current values (Iu, Iv, Iw) based upon the DC bus current values (Id1, Id2) and voltage vectors determined in correspondence to a PWM pulse pattern. The estimation of the three-phase motor current value (Iu, Iv, Iw) will be described later in reference to FIGS. 2A through 2C and 3.

The dq converter 111 calculates estimated current values (Id, Iq) through dq conversion executed based upon the three-phase motor current values (Iu, Iv, Iw) and the rotational position θ.

The current controller 110 calculates a voltage command (Vd*, Vq*) so as to match the estimated current values (Id, Iq) with current command values (Id*, Iq*) generated based upon a target torque. It is to be noted that a restriction is imposed with regard to the voltage command (Vd*, Vq*) so as to ensure that an input source current Isrc estimated by the source current calculator 240 does not exceed an input source current limit value (an input source current command). Such a restriction is imposed in consideration of the battery load condition and the estimated life of the battery.

The PWM generator 220 generates PWM waves to be used as a drive signal through pulse width modulation (PWM) based upon the voltage command (Vd*, Vq*) and the rotational angle θ. It then transmits the PWM waves to the pulse shift unit 230.

The pulse shift unit 230, having received a PWM pulse pattern (PWM waves) generated by the PWM generator 220, transmits a command indicating whether or not to execute a pulse shift, to the PWM generator 220.

Figure 10:
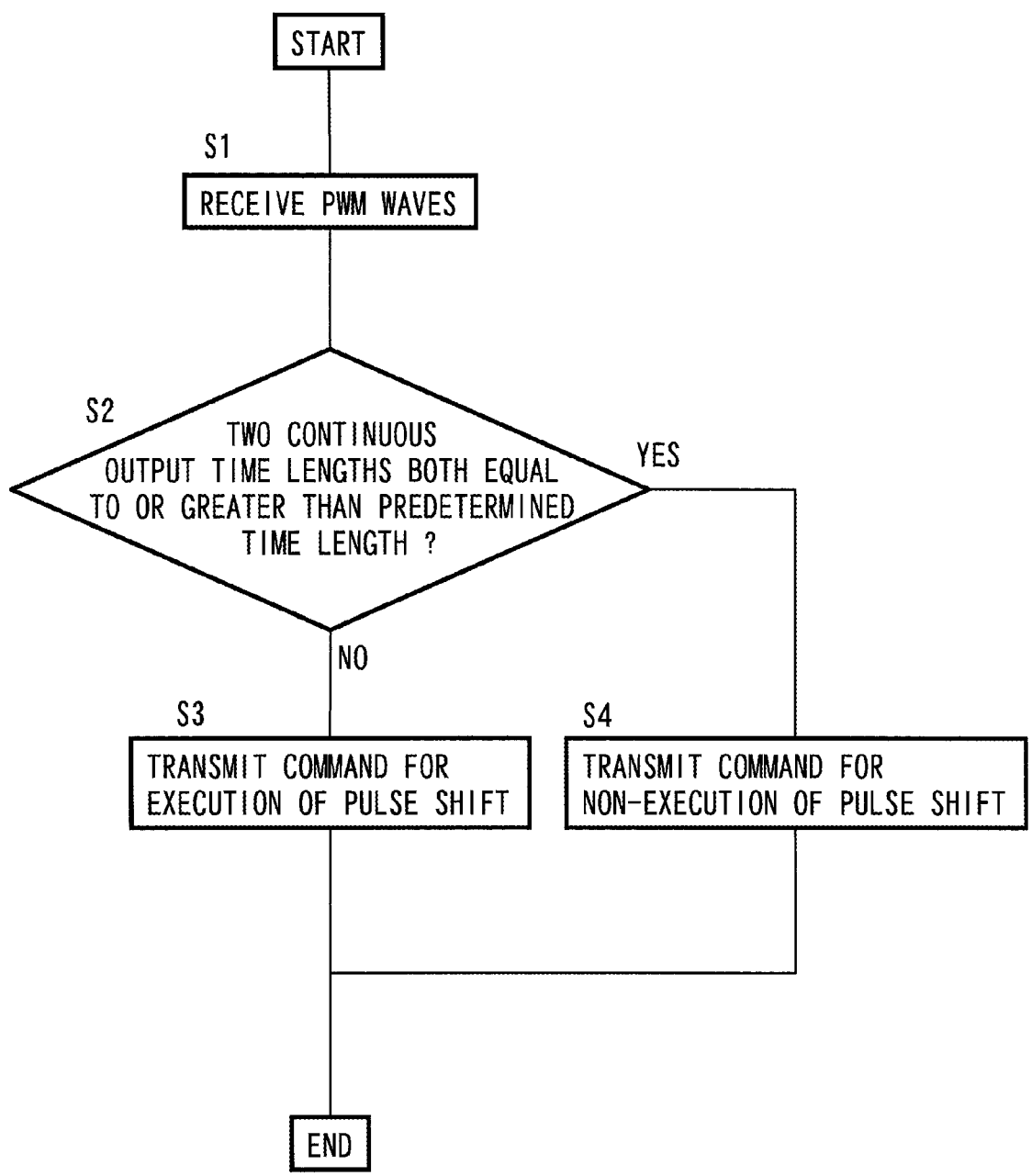
FIG. 10 is a chart pertaining to a function of the pulse shift unit related to pulse shift.

In reference to FIG. 10, a function of the pulse shift unit 230 related to the pulse shift will be described in specific detail. In step S1 in FIG. 10, the pulse shift unit 230 receives the PWM wave signal generated by the PWM generator 220. In step S2, the pulse shift unit 230 makes a decision as to whether or not two zones of a predetermined voltage vectors (see V1 and V2 on the falling edge side in FIGS. 2A through 2C) both extend over a predetermined time length (TPS) or longer. Upon making an affirmative decision, the operation proceeds to step S4, whereas upon making a negative decision, the operation proceeds to step S3. In step S4, the pulse shift unit 230 transmits a command indicating that a pulse shift is not to be executed to the PWM generator 220. The operation in the flowchart then ends. In step S3, the pulse shift unit 230 transmits a command indicating that a pulse shift is to be executed to the PWM generator 220. The operation in the flowchart then ends. It is to be noted that the operation in the flowchart presented in FIG. 10 is executed in each PWM cycle.

The PWM generator 220, having received the command issued by the pulse shift unit 230 indicating that a pulse shift is not to occur, transmits the PWM waves, which have been transmitted to the pulse shift unit 230, to the inverter circuit 130. On the other hand, the command indicating that a pulse shift is to occur is received, the PWM waves, having been transmitted to the pulse shift unit 230, undergo a pulse shift, and the PWM generator 220 transmits the PWM waves resulting from the pulse shift to the inverter circuit 130.

The inverter circuit 130 receives the PWM waves from the PWM generator 220 and adjusts the output voltage by controlling ON/OFF of the semiconductor switching elements based upon the PWM wave.

The source current calculator 240 includes an arithmetic operation unit (not shown) that calculates an average current value for a single PWM cycle based upon the instantaneous values Id1 and Id2 of the DC bus current Idc detected by the current detector 120, the PWM pulse pattern provided by the PWM generator 220 and a pulse shift amount indicating the extent of pulse shift, provided by the pulse shift unit 230, and an input source current estimating unit (not shown) that provides an estimated value by designating the average current value Ical as an input source current (source current) Isrc. The source current calculator 240 transmits information indicating the average current value Ical to the current controller 110. It is to be noted that the arithmetic operation executed by the source current calculator 240 will be described later in specific detail in reference to FIG. 4 and the like.

It is to be noted that when controlling the rotation speed of the motor 300 in the motor system 500, the motor rotation speed ωr is calculated based upon the change occurring in the rotational position θ over time and a voltage command or a current command is generated so as to match the motor rotation speed ωr with a speed command issued by a higher-order controller. In addition, when controlling the motor output torque, the current command (Id*, Iq*) is generated by using a mathematical expression or a map indicating the relationship between the motor currents (Id, Iq) and the motor torque.

Figure 3:
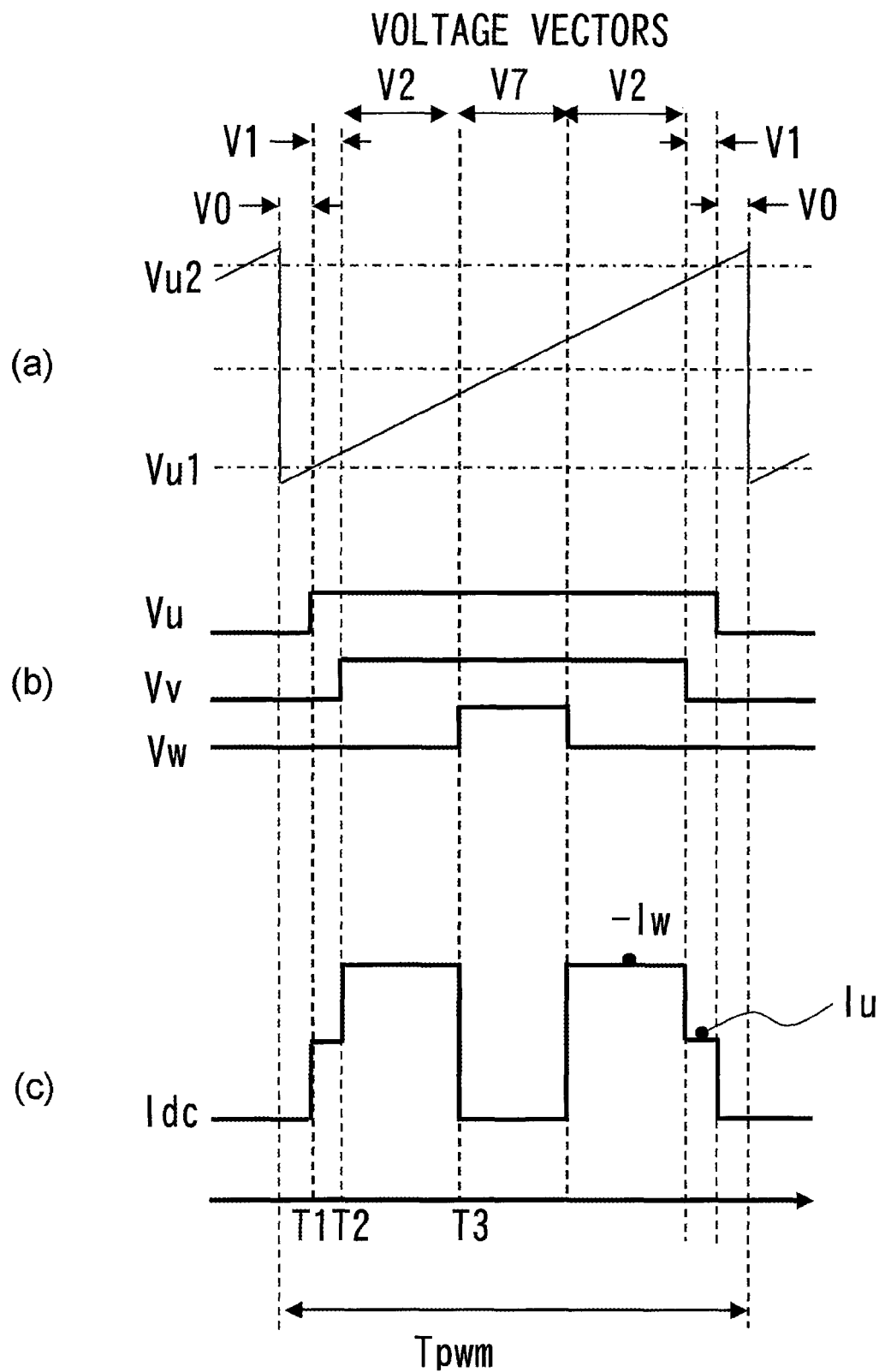
FIG. 3 is a waveform diagram indicating the timing with which the current is detected in the first embodiment.

FIG. 2A indicates the relationship among the inverter output voltage vectors (PWM pattern), the motor currents (Iu, Iv, Iw) and the DC bus current Idc. FIGS. 2B and 2C show how electric currents are applied to the inverter device 100 and the motor 300 respectively with a voltage vector V1 and a voltage vector V2. FIG. 3 shows the PWM and the pulse DC bus current corresponding to a single cycle (single PWM cycle) of the carrier frequency.

In reference to FIGS. 2A through 2C and FIG. 3, the operation executed to estimate the three-phase motor currents by detecting the DC bus current will be described.

The open/closed states of the switching elements (switches) in the inverter circuit 130 are determined in correspondence to each of the voltage vectors (V0 through V7) shown in FIG. 2A. The U, V and W in the PWM pattern column in FIG. 2A respectively indicate the open/closed states of the U-phase switches U+ and U−, V-phase switches V+, V− and W-phase switches W+ and W− (see FIG. 1). 0 entered in the PWM pattern column indicates that the positive pole-side switch is closed (OFF) and the negative pole-side switch is open (ON). 1 entered in the PWM pattern column indicates that the positive pole-side switch is open and the negative pole-side switch is closed. For instance, if 0 is entered in correspondence to the U-phase in the PWM pattern column, the positive pole-side switch U+ is closed and the negative pole-side switch U− is open.

Accordingly, the open/closed states of the switches corresponding to the voltage vector V1, i.e., the PWM pattern (1, 0, 0), are such that U+ is open, U− is closed, V+ is closed, V− is open, W+ is closed and W− is open, as indicated in FIG. 2B. Thus, current is applied as indicated in FIG. 2B in correspondence to these switch open/closed states. Under these circumstances, a current equal to the current Iu flowing through the switch U+ flows through the shunt resistor Rsh.

Likewise, the open/closed states of the switches corresponding to the voltage vector V2, i.e., the PWM pattern (1, 1, 0) are such that U+ is open, U− is closed, V+ is open, V− is closed, W+ is closed and W− is open, as indicated in FIG. 2C. Thus, current is applied as indicated in FIG. 2C in correspondence to these switch open/closed states. Under these circumstances, a current equal to the current −Iw flowing through the switch W− flows through the shunt resistor Rsh.

As described above, in correspondence to each PWM pattern, the three-phase motor current and the DC bus current achieve a specific relation and thus, the three-phase motor current values can be estimated by detecting the pulse DC bus current.

FIG. 3 shows the PWM and the pulse DC bus current for a single cycle (a single PWM cycle) of the carrier frequency. In the PWM generation timer operation shown in FIG. 3, the PWM pulses shown in (b) of FIG. 3 are generated with timing that allows a sawtooth wave or a triangular wave shown in (a) of FIG. 3 to match a voltage command value. In the figure, the U-phase PWM pulse rises with timing T1 whereby the voltage command value Vu1 and the timer count value with the sawtooth waveform match, a voltage Vu is output as the U-phase inverter output, and the U-phase PWM pulse falls with timing whereby the voltage command value Vu2 and a timer count value with the sawtooth waveform match. PWM pulses are generated in much the same way for the V-phase and the W-phase.

The DC bus current Idc in this situation is indicated in (c) of FIG. 3. Motor currents corresponding to two phases (Iu and −Iw in the figure) can be determined as indicated in FIGS. 2B and 2C by sampling the current twice during the single PWM cycle (for V1 and V2 on the falling edge side in the figure). The motor current for the remaining phase can be determined through arithmetic operation, since the three-phase motor currents have a relationship expressed as;

$$Iu+Iv+Iw=0.$$

It is to be noted that while "the current is sampled twice during a single cycle" in the description provided above, the two instances of current sampling do not occur at exactly the same time, as indicated in (c) of FIG. 3. However, in comparison to the inverter device, the motor is a system with a sufficiently large time constant and accordingly, the conditions of the currents in the motor 300 may be considered to manifest hardly any change even as the switching conditions at the inverter device 100 change. In other words, the two instances of current sampling may be regarded to occur at the same time. In addition, the change occurring over time in the DC bus current Idc in each voltage vector is insignificant and can be disregarded in consideration of the level of motor inductance, which is another factor making possible the current sampling described above.

A minimum pulse width TPS (minimum sampling period TPS) is needed to ensure that the peak of the pulse DC bus current Idc is detected reliably through this process. In addition, in order to improve the detection accuracy for narrower PWM pulses, the signal difference (line voltage pulse width) between PWM pulses corresponding to two phases is determined in advance through calculation executed by the pulse shift unit 230 and the current is sampled by the current detector 120 with optimal trigger timing Trig. The factors that determine the minimum pulse width TPS include the level of the main circuit inductance at the inverter, the through rate and the response of the detection circuit, the sampling time at the A/D converter, and the like. Preferably, the current should be sampled through the vector V0 and the vector V7 so as to enable detection of any offset error in the current detection circuit and ultimately enable offset correction for the current sensor. It is to be noted that the "predetermined time length" in step S2 in FIG. 10 is synonymous with the minimum pulse width TPS.

Next, in reference to FIG. 4, the arithmetic operation executed by the source current calculator 240 will be described. In (a) of FIG. 4, a timer count value represented by a sawtooth waveform, which indicates a PWM pulse generating carrier cycle is indicated. In (b) of FIG. 4, three-phase PWM pulses in a standard inverter through a single PWM cycle corresponding to an instantaneous voltage command is shown. In (c) of FIG. 4, the DC bus current Idc' corresponding to (b) of FIG is indicated. 4. In (d) of FIG. 4, PWM pulses having undergone a pulse shift are shown. In (e) of FIG. 4, the DC bus current Idc corresponding to (d) of FIG. 4 is shown. It is to be noted that I_flit' in (c) of FIG. 4 and I_flit in (e) of FIG. 4 pertain to the related art, and will be referred to later when comparing the present invention with the related art.

First, a method for calculating, through arithmetic operation, the DC bus current Idc' in (c) of FIG. 4 and the input source current Isrc in conjunction with the standard PWM pulses in (b) of FIG. 4 will be described. The differences between various phase pulse widths, among a U-phase PWM pulse width Upw', a V-phase PWM pulse width Vpw' and a W-phase PWM pulse width Wpw' are applied as line voltage at the motor 300, causing motor currents to flow. The DC bus current (waveform) Idc' is the current that flows from the smoothing capacitor to the inverter circuit 130 in this situation.

A pulse width t1 representing the difference between the U-phase PWM pulse and the V-phase PWM pulse, observed on the rising edge side and the falling edge side of the PWM pulses is calculated as;

(U-phase PWM pulse width $Upw'$–V-phase PWM pulse width $Vpw'$)/2.

It is to be noted that since t1 manifests twice, once on the rising edge side and again on the falling edge side, the difference is divided by 2. In addition, the DC bus current value assumed in this zone (voltage vector V1) is Id1'. The motor current Iu is assumed to be equal to Id1'.

Likewise, a pulse width t2 representing the difference between the V-phase PWM pulse and the W-phase PWM pulse, observed on the rising edge side and the falling edge side of the PWM pulses is calculated as;

(V-phase PWM pulse width $Vpw'$–W-phase PWM pulse width $Wpw'$)/2.

It is to be noted that since t2 manifests twice, once on the rising edge side and again on the falling edge side, the difference is divided by 2. In addition, the DC bus current value assumed in this zone (voltage vector V2) is Id2'. The motor current –Iw is assumed to be equal to Id2'.

It is to be noted that Id1' and Id2' can be sampled as described above, since the change occurring in the DC bus current Idc through the zones represented by the pulse widths t1 and t2 is insignificant relative to the motor inductance and may be disregarded.

Thus, when the PWM pulses do not undergo a pulse shift, the average current value Ical of the DC bus current Idc during a single PWM cycle can be determined through arithmetic operation executed as expressed in (A) below.

$Ical=\{(Id1'\times t1+Id2'\times t2)\times 2\}/Tpwm$ (A)

This average current value Ical is then designated as an estimated input source current Isrc.

In reference to (d) and (e) of FIG. 4, the waveform of the DC bus current, manifesting when a pulse shift is applied, will be described.

When detecting the instantaneous values Id1 and Id2 of the DC bus current Idc via an A/D converter such as a microcomputer, the minimum pulse width TPS of the pulse widths t1 and t2 must be greater than a sampling time length Tad. Accordingly, detection of the DC bus current Idc is enabled by shifting the phase of the waveform of a PWM pulse in (b) of FIG. 4 relative to the phase of the waveform of another PWM pulse (pulse shift) so as to assure the minimum pulse width TPS.

For instance, the instantaneous value Id1 of the DC bus current Idc may be sampled on the falling edge side of the PWM pulses by retarding the phase of the U-phase pulse by an extent equal to a pulse shift amount Tt1 in reference to the V-phase pulse and increasing the pulse width (the time difference between the falling edge of the U-phase pulse and the falling edge of the V-phase pulse, i.e., the length of time over which the output is continuously provided with the voltage vector V1, on the falling edge side), so as to achieve a pulse width TPS1 equal to or greater than the minimum pulse width TPS without exiting the voltage vector zone V1.

On the rising edge side of the PWM pulses, however, the relationship between the U-phase pulse and the V-phase pulse changes, prompting a switch to the voltage vector V4 and causing a pulse current (with an instantaneous value –Iu, i.e. the U-phase current value with the appended sign inverted) to flow in correspondence to the instantaneous value Id2" of the DC bus current Idc.

The voltage vector V1, having been extended on the falling edge side of the PWM pulses is canceled out with the voltage vector V4 on the PWM pulse rising edge side, so as to equalize the pre-pulse shift voltage average for a single PWM cycle.

Likewise, the phase of the W-phase pulse is advanced by an extent equal to a pulse shift amount Tt2 in reference to the V-phase pulse, and the pulse width (the time difference between the falling edge of the W-phase pulse and the falling edge of the V-phase pulse) is thus increased, so as to achieve a pulse width TPS2 equal to or greater than the minimum pulse width TPS without exiting the voltage vector zone V2. On the rising edge side of the PWM pulses, the voltage vector is switched to V5, causing a pulse current (with an instantaneous value Iw for the W-phase current) to flow in correspondence to an instantaneous value Id1" of the DC bus current Idc.

Through the operation described above, the motor can be controlled with the voltage applied to the motor and the phases thereof adjusted by generating a sufficient length of sampling time on the PWM pulse falling edge side without altering the average value for the voltage applied to the motor through a single PWM cycle.

It is to be noted that since fixed current control is executed for the motor currents corresponding to the three phases with the PWM pulse widths Upw, Vpw and Wpw, the motor current values are controlled to remain substantially the same regardless of whether or not the PWM pulses undergo a pulse shift. For instance, the following relationship is sustained with regard to the U-phase PWM pulse and the V-phase PWM pulse; instantaneous value Id1' of the DC bus current Idc when no pulse shift is applied≈instantaneous value Id1 of the DC bus current Idc when a pulse shift is applied.

Next, in reference to (d) and (e) of FIG. 4, a method for determining the average current value Ical for a single PWM cycle in conjunction with the PWM pulses having undergone a pulse shift will be described. It is to be noted that the average current value Ical through a single PWM cycle calculated in conjunction with the PWM pulses having undergone a pulse shift is obviously designated as an estimated input source current Isrc corresponding to the PWM pulses having undergone the pulse shift.

The pulse width TPS1 in (d) of FIG. 4, representing the difference between the U-phase applied voltage and the V-phase applied voltage at the PWM pulse falling edge side is calculated as expressed below.

$$TPS=(\text{U-phase pulse edge timing}-\text{V-phase pulse edge timing})$$

It is to be noted that while it is desirable that TPS1 take a value greater than the value calculated as expressed above by an extent matching the inverter dead time Td, the dead time Td is not taken into consideration here.

The current for the U-phase PWM pulse and the V-phase PWM pulse on the falling side is calculated as TPS1×Id1. The pulse width TPS1 is equal to the sum (pulse width t1+pulse shift amount Tt1) and accordingly, $$(t1+Tt1)\times Id1=t1\times Id1'+Tt1\times Id1.$$

The PWM pulses Upw, Vpw and Wpw are achieved through a pulse shift by an extent equal to the pulse shift amount Tt1 with the three-phase PWM pulse widths Upw', Vpw' and Wpw' remaining unchanged. Accordingly, the pulse width corresponding to the instantaneous value Id2" is t1−Tt1 (t1<Tt1 in (d) of FIG. 4), and Id2"≈−Id1'

As a result, the current for the U-phase PWM pulse and the V-phase PWM pulse on the rising side is calculated as;

$$(t1-Tt1)\times Id2''=t1\times Id1'-Tt1\times Id1.$$

Thus, the sum of the current values for the U-phase and the V-phase PWM pulses on the rising side and on the falling side can be calculated as;

$$(t-Tt1)\times Id2''+(t1+Tt1)\times Id1=2\times t1\times Id1'=2\times t1\times Id1.$$

Since t1=(TPS1−−Tt1), the average current value Ical1 through a single PWM cycle can be calculated as below based upon the relationship between the U-phase and the V-phase.

$$Ical1=2\times(TPS1-Tt1)\times Id1/Tpwm \quad (B)$$

A similar principle applies with regard to the W-phase and the V-phase. The current for the W-phase and V-phase PWM pulses on the falling side is calculated as TPS2×Id2, the pulse width TPS2 is equal to the sum (pulse width t2+pulse shift amount Tt2) and Id2'≈Id2. Accordingly, $$(t2+Tt2)\times Id2=t2\times Id2'+Tt2\times \Delta Id2.$$

The PWM pulses Upw, Vpw and Wpw are achieved through a pulse shift by an extent equal to the pulse shift amount Tt2 with the three-phase PWM pulse widths Upw', Vpw' and Wpw' remaining unchanged. Accordingly, the pulse width corresponding to the instantaneous value Id2" is t2−Tt2 (t2<Tt2 in (d) of FIG. 4) and Id1"≈−Id2'.

As a result, the current for the W-phase PWM pulse and the V-phase PWM pulse on the rising side is calculated as;

$$(t2-Tt2)\times Id1''=t2\times Id2'-Tt2\times Id2.$$

Thus, the sum of the current values for the V-phase and the W-phase PWM pulses on the rising side and the falling side can be calculated as;

$$(t2-Tt2)\times Id1''+(t2+Tt2)\times Id2=2\times t2\times Id2'=2\times t2\times Id2.$$

Since t2=(TPS2−Tt2), the average current value Ical2 through a single PWM cycle can be calculated as below based upon the relationship between the W-phase and the V-phase.

$$Ical2=2\times(TPS2-Tt2)\times Id2/Tpwm \quad (C)$$

Accordingly, the average current value Ical through a single PWM cycle that needs to be determined can be calculated based upon expressions (B) and (C) as;

$$Ical=Ical1+Ical2=2\times\{(TPS1-Tt1)\times Id1+(TPS2-Tt2)\times Id2\}/Tpwm \quad (D)$$

The value Ical thus calculated is then designated as an estimated input source current Isrc corresponding to the PWM pulses having undergone the pulse shift. It is to be noted that since TPS1−Tt1=t1, TPS2−Tt2=t2, Id1≈Id1' and Id2≈Id2', it is understood that expression (A) and expression (D) are substantially equivalent. Namely, the average current value Ical calculated for a single PWM cycle in correspondence to the PWM pulses without a pulse shift is substantially equal to the average current value Ical calculated for a single PWM cycle in correspondence to the PWM pulses having undergone a pulse shift.

Provided that the dead time at the inverter is insignificant and may be disregarded, Isrc may be calculated as;

$$Isrc=((Upw-Vpw)\times Id1+(Vpw-Wpw)\times Id2)/Tpwm$$

As described above, the present invention makes it possible to calculate the current values for a single PWM pulse cycle with a high level of accuracy and thus achieves an improvement in the accuracy with which the average current value Ical for a single PWM cycle is calculated as an estimated input source current value even when the PWM pulses undergo a pulse shift.

While the motor 300 is being driven, the arithmetic operation should be executed by factoring in the relationship among the individual PWM pulse levels so as to estimate the input source current Isrc accurately, unaffected by the frequency characteristics attributable to analog filtering.

It is to be noted that the motor current Iu and the motor current −Iw can be detected accurately regardless of whether or not a pulse shift is applied or regardless of the pulse shift time width by sampling the instantaneous values Id1 and Id2 of the DC bus current with timing set in reference to the falling edge of the V-phase pulse, which remains unshifted even in the event of a pulse shift.

Through the measures described above, the source current calculator 240 is able to calculate the average current value Ical with a high level of accuracy and thus estimate a highly accurate input source current Isrc regardless of whether or not a pulse shift is applied, i.e., over the entire operational range of the motor 300. Furthermore, the source current calculator 240 can be controlled via the inverter circuit 130 in correspondence to the battery load condition and the estimated life of the battery so as to ensure that the estimated input source current Isrc does not exceed the limit value (input source current command) for the input source current Isrc.

Figure 5:
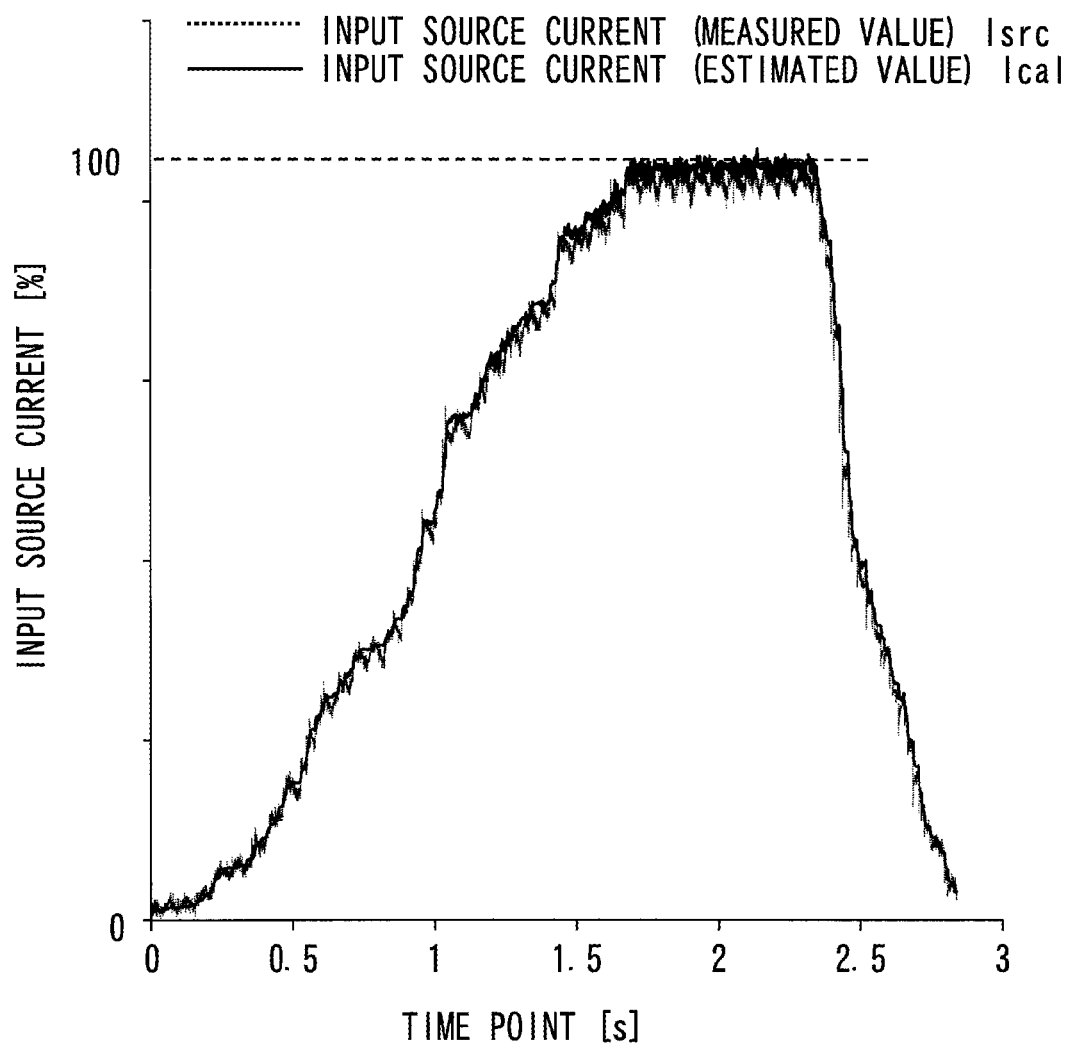
FIG. 5 is a characteristics diagram presenting the input source current detection results obtained in the first embodiment.

FIG. 5 presents the results obtained by comparing the average current value Ical (estimated input source current Isrc) calculated in conjunction with the DC bus current Idc by using the arithmetic operation logic according to the present invention with the input source current Isrc ascertained through actual measurement. The results, indicating the current detection accuracy with the maximum rated current set at 100%, demonstrate that the input source current Isrc is estimated accurately over the range from zero current through the maximum current.

The following advantages are achieved through the first embodiment.

(1) The inverter device 100 achieved in the first embodiment is configured as follows.

It comprises the positive pole-side terminal 80, the negative pole-side terminal 81, the inverter circuit 130, the smoothing capacitor 160, the positive pole-side connection point 90 that electrically connects the positive pole-side terminal 80, the positive pole side of the inverter circuit 130 and the smoothing capacitor 160, the negative pole-side connection point 91 that electrically connects the negative pole-side terminal 81, the negative pole side of the inverter circuit 130 and the smoothing capacitor 160, the PWM generator 220 that generates PWM waves corresponding to the three phases to be used to drive the inverter circuit 130, the pulse shift unit 230, which will be described below, the current detector 120 that detects the DC bus current Idc flowing between the negative pole-side connection point 91 and the inverter circuit 130 and the source current calculator 240, which will be described below.

Based upon the lengths of time over which the output is continuously provided in correspondence to two predetermined voltage vectors (the voltage vectors V1 and V2 on the falling edge side, see FIG. 4) among various voltage vectors generated based upon the temporal positional relationship (PWM pulse pattern) among the various phases of the PWM waves, the pulse shift unit 230 generates a first command in response to which the PWM generator 220 executes a pulse shift if at least one of the continuous output time lengths corresponding to the two predetermined voltage vectors is less than the respective predetermined time length TPS1 or TPS2 and generates a second command indicating that the PWM generator 220 is not to execute a pulse shift if the continuous output time lengths corresponding to the two predetermined voltage vectors are both equal to or greater than the respective predetermined time lengths TPS1 and TPS2.

The source current calculator 240 includes the arithmetic operation unit (not shown) that calculates the average current value Ical of the DC bus current Idc through a PWM cycle based upon the instantaneous values Id1 and Id2 of the DC bus current Idc detected at predetermined time points occurring during the continuous operate periods corresponding to the voltage vectors V1 and V2 within the PWM cycle and the input source current estimating unit (not shown) that provides an estimated input source current Isrc by designating the average current value Ical of the DC bus current Idc through the PWM cycle as the input source current Isrc flowing between the positive pole-side terminal 80 and the positive pole-side connection point 90 or between the negative pole-side terminal 81 and the negative pole-side connection point 91 during the PWM cycle.

The inverter device 100 achieved in the first embodiment, configured as described above, achieves the following advantages.

Even when a pulse shift is applied, the input source current Isrc can be estimated accurately and the response can be improved as will be explained later. In addition, apart from the shunt resistor Rsh, via which the DC bus current Idc at the inverter circuit 130 is detected, the inverter device 100 does not include any additional shunt resistors. This means that the present invention, in comparison to an invention that includes shunt resistors used to detect the motor currents Iu, Iv and Iw and the input source current Isrc, requires fewer components, achieves a reduction in the installation area and ultimately brings down the production cost.

The present invention is compared to a comparative example in which the input source current is estimated based upon a current value obtained by filtering a detection value for the DC bus current Idc. In (c) and (e) of FIG. 4, a filtered current value I_filt to be compared with the present invention is shown. The ripple in the filtered current value I_filt detected in the comparative example increases through a pulse shift applied to the PWM pulses. This means that the ripple in the filtered current value I_filt is affected by a motor voltage application condition, i.e., whether or not a pulse shift is applied, and thus, the DC bus current Idc cannot be sampled with good detection accuracy over the entire motor operational range, which makes it difficult to estimate the input source current Isrc with accuracy. In addition, if stability is to be achieved by raising the filter time constant, the response of the DC bus current Idc will have to be compromised and thus required characteristics will not be assured.

In the inverter device 100 according to the present invention, the average current value Ical for a single PWM cycle is determined through arithmetic operation executed based upon the PWM pulse widths, the pulse shift amount and the DC bus current Idc and Ical is then designated as an estimated input source current Isrc. As will be described below, the average current value Ical for a single PWM cycle calculated when a pulse shift is not applied and the average current value Ical for a single PWM cycle calculated when a pulse shift is applied are substantially equal to each other, and thus, the input source current Isrc can be estimated when a pulse shift is applied with great accuracy comparable to that with which the input source current Isrc is estimated when a pulse shift is not applied. Consequently, the input source current Isrc can be estimated with better accuracy compared with the comparative example. In addition, since the present invention does not require any filter processing, the issue of compromised response due to an increase in the filter time constant does not arise. In other words, the present invention assures better response than the comparative example.

(2) The source current calculator 240 calculates the average value Ical (see expression (D)) for the DC bus current flowing through a PWM cycle when a pulse shift is applied, based upon the instantaneous values detected for the DC bus current, the continuous output time lengths corresponding to the two predetermined voltage vectors during which the instantaneous values are detected, and the pulse shift amount indicating the extent of the pulse shift at the PWM generator 220.

The average current value Ical calculated for the DC bus current when a pulse shift is applied through the process described above is substantially equal to the average current value Ical (see expression (A)) for the DC bus current calculated when no pulse shift is applied. Thus, the input source current Isrc can be estimated with the pulse shift hardly affecting the outcome.

(3) The current controller 110 outputs a command for the PWM generator 220 based upon the estimated input source current Isrc. In response to the command, the PWM generator 220 transmits PWM waves to the inverter circuit 130. The inverter circuit 130 controls the actual input source current with the PWM waves.

As described in (1) and (2) above, the input source current Isrc is estimated with high accuracy, which, in turn, enables the inverter circuit 130 to accurately control the actual input source current Isrc. As a result, the motor 300, too, can be controlled accurately.

(4) Furthermore, the source current calculator 240 calculates the input source current Isrc by detecting the current values corresponding to specific PWM pulse patterns (see FIG. 4).

Thus, even in a failure mode (phase loss mode), in which power cannot be supplied in correspondence to a phase among the three phases due to a motor wiring disconnection or an inverter failure, the current detection value corresponding to the failed phase (lost phase) in the power supply pattern can be correctly calculated to be 0. Consequently, the input source current Isrc can be calculated accurately even in the event of a phase loss failure.

—Second Embodiment—

Next, the arithmetic operation executed to calculate the input source current in the second embodiment of the present invention will be described mainly in reference to FIG. 6 and FIG. 9.

Figure 6:
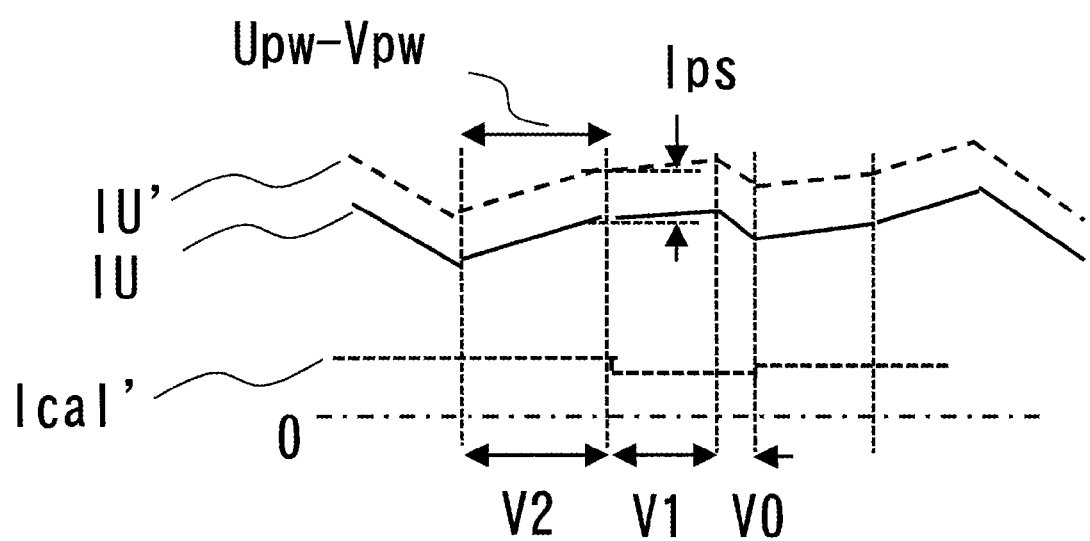
FIG. 6 is a waveform diagram indicating how the input source current calculation operation is executed in a second embodiment.

FIG. 6 shows a part of the U-phase motor current. As FIG. 6 indicates, a pre-correction motor current value IU' contains a current error Ips attributable to a pulse shift, whereas a motor current value IU is a corrected current value obtained by correcting the current error Ips attributable to the pulse shift.

Figure 9:
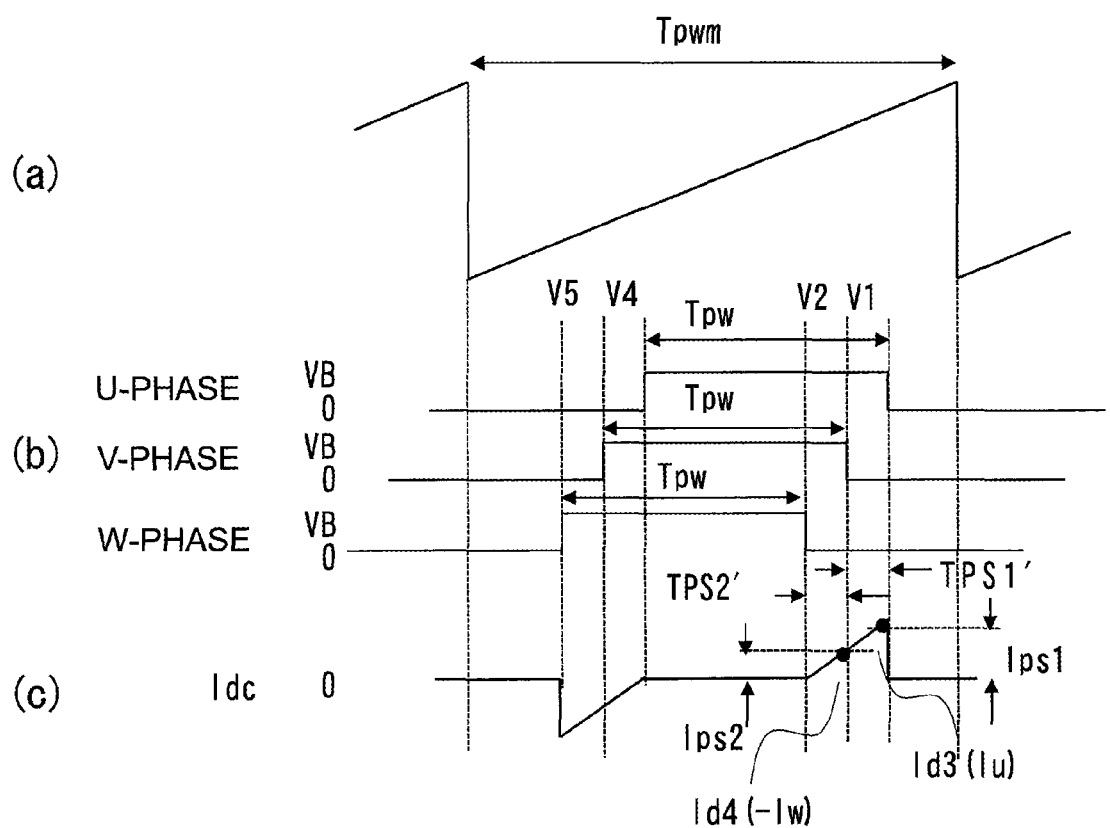
FIG. 9 is a waveform diagram indicating how the current errors are determined in the second embodiment.

FIG. 9 indicates a PWM pulse shift applied at a PWM duty ratio of 50% and the corresponding DC bus current. When no pulse shift is applied and the PWM duty ratio corresponding to the three phases are all 50% (not shown), no DC bus current Idc flows (zero current) since the pulse widths for the three phases are equal and the rising edges and the falling edges corresponding to the three phases match. Under these conditions, current detection cannot be executed in conjunction with the single shunt current detection logic, whereby a current is detected with timing with which an inter-phase potential between phases among the three phases is generated (e.g., a pulse width TPS1' representing the difference between the U-phase and the V-phase or a pulse width TPS2' representing the difference between the W-phase and the V-phase).

Accordingly, detection of zero current is enabled through a pulse shift. As indicated in (c) of FIG. 9, while the average value of the DC bus current Idc within a single PWM cycle is substantially equal to 0 (the average value of motor currents through the single PWM cycle is also 0), current errors Ips1 and Ips2 are detected as instantaneous values Id3" and Id4" of the DC bus current Idc. In particular, over a range in which the motor currents are close to 0, the effect of the current errors Ips1 and Ips2 is bound to be significant, and thus, these current errors Ips1 and Ips2 should be pre-learned through calibration at the time of, for instance, power-up, so as to detect the motor currents with a high level of accuracy. In the present embodiment, the input source current Isrc can be estimated through arithmetic operation executed based upon the relationship among the vectors of the applied voltage, the motor currents and the DC bus current indicated in FIGS. 2A through 2C.

For instance, the current value for the voltage vector zone V1 (see (d) and (e) of FIG. 4) can be determined based upon the difference in the PWM pulse width (Upw−Vpw) between the U-phase and the V-phase as; current value for zone V1=IU*(Upw—Vpw). A current value for another voltage vector zone can be calculated in much the same way. By calculating the sum of these current values and dividing the sum by the single PWM cycle Tpwm so as to determine a time average, an average current value Ical is calculated and thus, an estimated input source current Isrc is obtained.

Since the current errors Ips1 and Ips2 attributable to the pulse shift are eliminated from the values used to calculate the motor currents (IU, IV, IW) through correction, there is no need to factor in the current errors Ips1 and Ips2 when calculating the input source current Isrc. According to the present invention, since the current errors Ips1 and Ips2 attributable to the pulse shift are corrected in advance, an advantage is achieved in that the load of the microcomputer arithmetic processing executed to calculate the input source current Isrc is lessened.

It is to be noted that while an explanation has been given in reference to the present embodiment by assuming that the PWM duty ratio (pulse widths) is 50%, the current errors Ips1 and Ips2 can be obtained through a pulse shift applied with the duty ratios corresponding to the individual phases set equal to one another.

The following advantage is achieved through the second embodiment.

The source current calculator 240 estimates the motor current IU based upon an instantaneous value detected for the DC bus current Idc and the voltage vector in correspondence to which the instantaneous value is detected, corrects the motor current IU by eliminating a current error Ips (Ips1) attributable to a pulse shift applied in the voltage vector zone at the time of the instantaneous value detection, and calculates a current value for the VI zone based upon the corrected motor current IU and the pulse widths Upw and Vpw corresponding to different phases of the PWM waves. A current value is likewise determined in correspondence to another voltage vector zone, the sum of the current values is calculated, and the sum is then divided by the PWM cycle Tpwm so as to calculate the average value Ical for the DC bus current Idc through the PWM cycle in the event of a pulse shift.

A current error Ips included in a motor current, attributable to a pulse shift, is represented by an instantaneous value of the DC bus current Idc detected by the current detector 120 when a pulse shift is applied, via the PWM generator 220, by setting the PWM duty ratios corresponding to the individual phases equal to one another.

Through these measures, the current errors Ips in the motor currents are eliminated and the input source current Isrc can be estimated with a higher level of accuracy, achieved through elimination of the errors.

—Inverter Device Installation Example 1—

Figure 7:
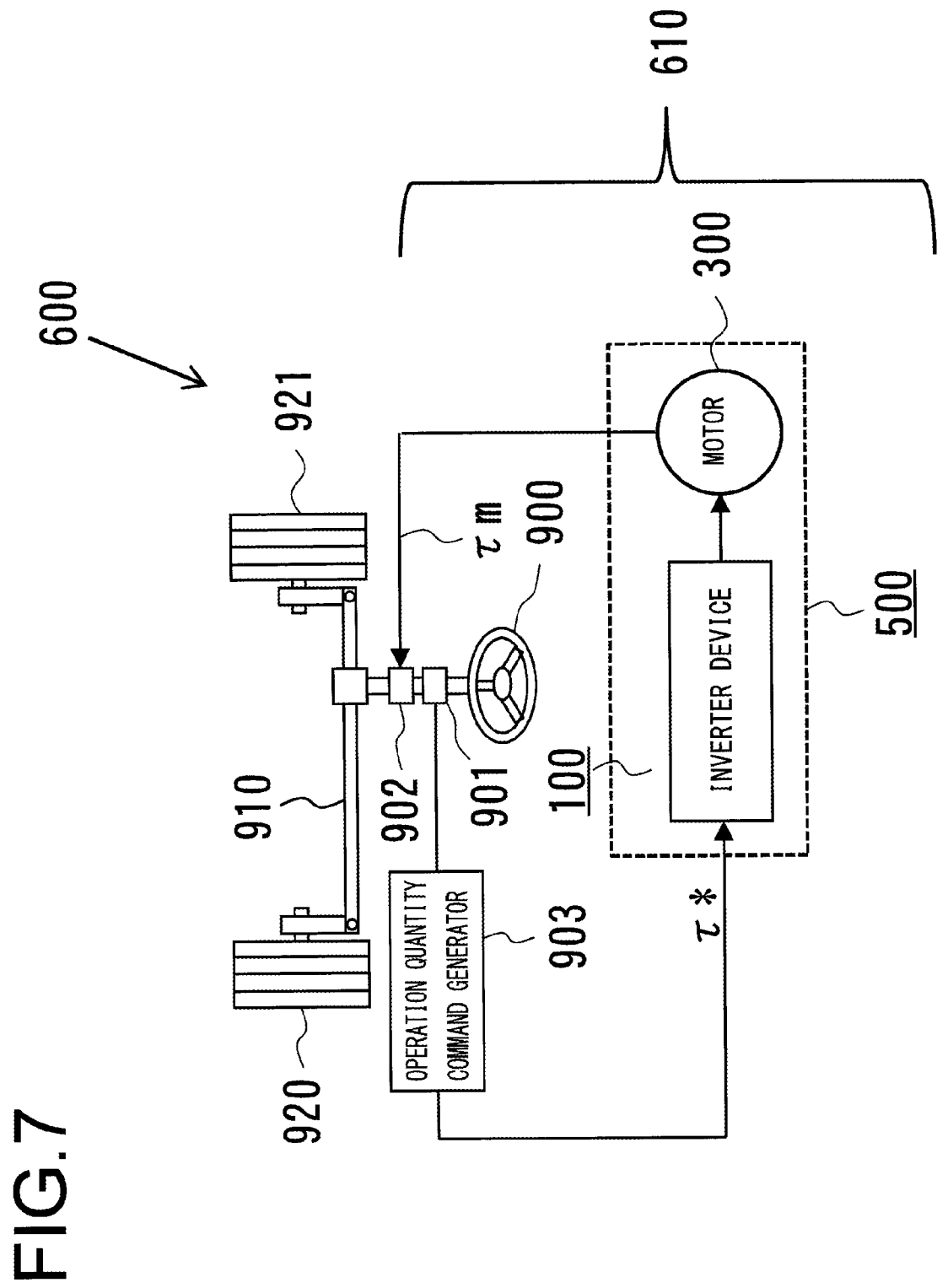
FIG. 7 is a diagram showing the configuration of an electric power steering system adopting the inverter device according to the present invention.

FIG. 7 is a diagram showing the configuration of an electric power steering system that includes the inverter device 100 according to the present invention. In reference to FIG. 7, an electric power steering system 600 will be described.

The electric power steering system 600 comprising an electric actuator 610, a steering wheel 900, a steering detector 901 and an operation quantity command generator 903, assumes a structure in which the operation force at the steering wheel 900 operated by the driver provides torque assistance via the electric actuator.

The electric actuator 610 includes a motor system 500 having a torque transmission mechanism 902, a motor 300 and the inverter device 100 installed therein, as shown in FIG. 7.

A torque command τ*, which is generated by the operation quantity command generator 903 as a steering assist torque command for the steering wheel 900, carries an instruction for reducing the required steering force to be exerted by the driver by using the output from the electric actuator 610.

In response to the torque command τ* input thereto, the inverter device 100 controls the motor currents based upon the torque constant of the motor 300 and the torque command τ* so as to conform to a torque command value.

A motor output τm provided through an output shaft directly connected to the rotor of the motor 300 is transmitted as torque via the torque transmission mechanism 902 configured with, for instance, a speed reducing mechanism such as a worm drive, a gear wheel and a planetary gear or a hydraulic mechanism, to a rack 910 of the steering system, and the steering angles of wheels 920 and 921 are adjusted while the steering force (operation force) that the driver needs to exert at the steering wheel 900 is lessened (assisted) with the electric force.

An assistance quantity representing the extent of assistance to be provided is determined by the operation quantity command generator 903 by detecting, via the steering detector 901 built into the steering shaft to detect steering conditions, an operation quantity represented by a steering angle or a steering torque, and then factoring in condition quantities such as the vehicle speed and the road surface conditions, and the assistance quantity thus determined is indicated in the torque command $\tau^*$.

As explained earlier, the inverter device 100 calculates the inputs source current Isrc by detecting the current values corresponding to specific PWM pulse patterns. Thus, even in a failure mode (phase loss mode), in which power cannot be supplied in correspondence to a phase among the three phases due to a motor wiring disconnection or an inverter failure, the current detection value corresponding to the failed phase (lost phase) in the power supply pattern can be correctly calculated to be 0. Consequently, the input source current Isrc can be calculated accurately even in the event of a phase loss failure. Thus, even when the electric power steering system is continuously engaged in operation in an emergency situation in a phase loss failure state, in order to maneuver the vehicle up onto a curb while sustaining the current steering angle, excessive consumption of battery current for purposes of yielding a large motor output can be prevented.

Furthermore, since the inverter device 100 is capable of controlling the actual input source current based upon the estimated input source current Isrc as explained earlier, smooth steering assistance can be provided even as the steering wheel is turned back and forth to repeatedly alternate from a light-load operation to a heavy-load operation in response to an input source current command carrying an instruction for keeping down the assistance quantity when there is a concern for low battery voltage, e.g., when the vehicle speed is low and the steering quantity is significant in a low battery condition.

—Inverter Device Installation Example 2—

Figure 8:
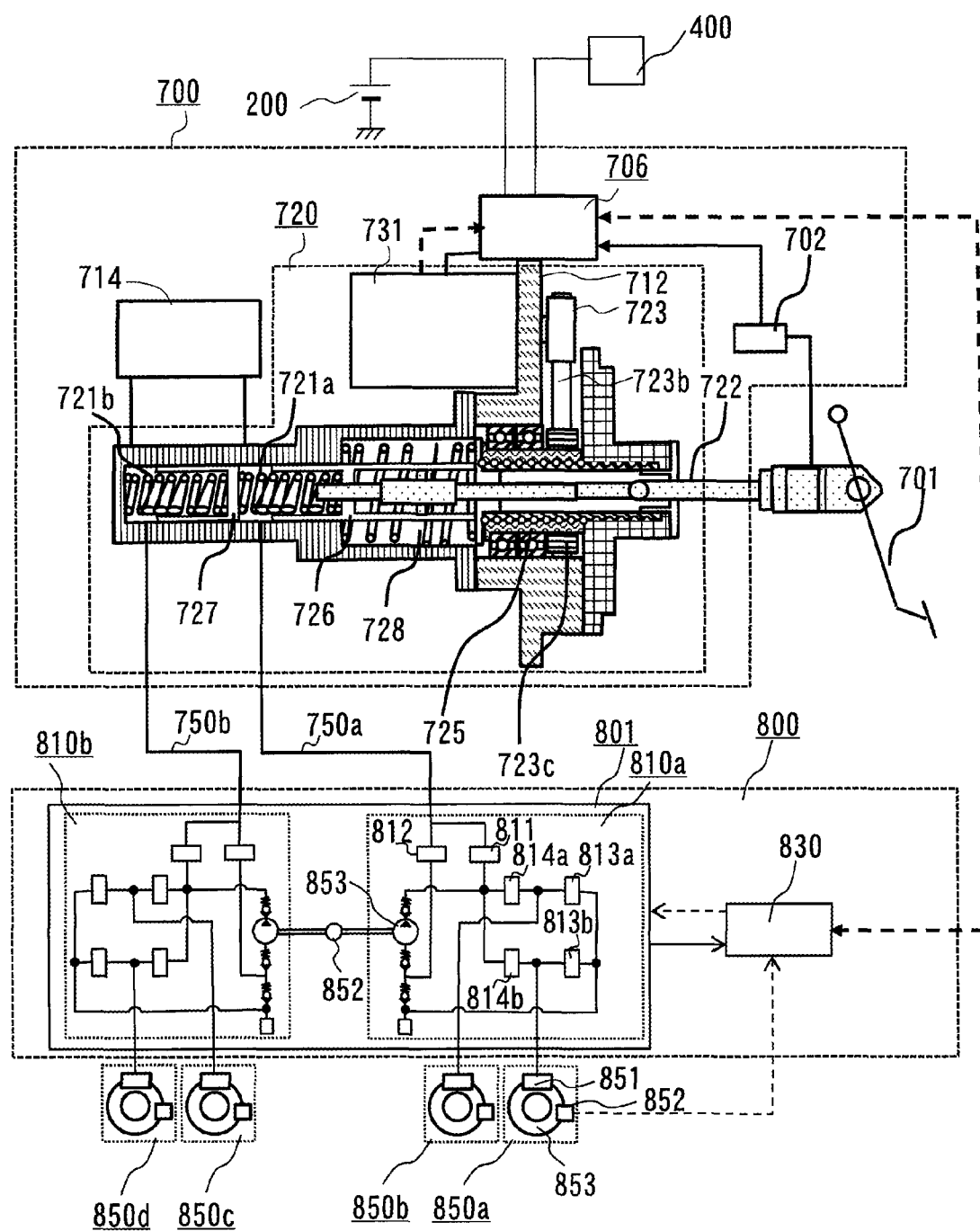
FIG. 8 is a diagram showing the configuration of an electric braking system adopting the inverter device according to the present invention.

FIG. 8 is a system block diagram showing the configuration of a vehicle braking system.

An assistance control unit 706 in FIG. 8, having a function similar to that of the inverter device 100, is programmed in its microcomputer so as to be able to execute braking operation for a vehicle. In addition, a motor 731 differs from the motor 300 in that it is mounted as an integrated part of a brake assist device 700. By a casing 712, an integrated structure is configured by the motor 731 and the assistance control unit 706.

The vehicle braking system includes a brake pedal 701, the brake assist device 700, a booster unit 800 and wheel mechanisms 850*a* through 850*d*. The brake assist device 700 includes an assistance mechanism 720, a primary fluid chamber 721*a*, a secondary fluid chamber 721*b* and a reservoir tank 714. The operation quantity at the brake pedal 701 operated by the driver is input to the assistance mechanism 720 via an input rod 722 and is then transmitted to the primary fluid chamber 721*a*.

In addition, the brake operation quantity detected by a stroke sensor 702 mounted at the brake pedal 701 is input to the assistance control unit 706 that controls the assistance mechanism 720. The assistance control unit 706 controls the motor 731 so as to achieve a rotational position corresponding to the brake operation quantity input thereto. The rotational torque generated at the motor is transmitted, via a speed reduction unit 723, to a ball screw 725 configuring a rotation-translation conversion device that converts rotary power to translation power, pushes a primary piston 726 so as to raise the hydraulic pressure in the primary fluid chamber 721*a* and also pressurizes a secondary piston 727 so as to raise the hydraulic pressure in the secondary fluid chamber 721*b*.

The hydraulic pressure of the hydraulic fluid having been pressurized in the primary fluid chamber 721*a* and the secondary fluid chamber 721*b*, is input to the booster unit 800 via master pipings 750*a* and 750*b*, and in response to a command issued by a booster control unit 830, the booster unit 800 transmits the hydraulic pressure to the wheel mechanisms 850*a* through 850*d* so as to generate a braking force for the vehicle.

The assistance control unit 706 controls the extent of displacement of the primary piston 726 in order to adjust the extent to which the primary piston 726 is pushed. Instead of directly detecting the displacement of the primary piston 726, the displacement of the primary piston 726 is calculated through arithmetic operation in correspondence to the extent to which the ball screw 725 is driven by calculating the rotational angle of the motor 731 based upon a signal provided by a rotational position sensor (not shown) installed in the motor.

It is to be noted that even if the motor 731 goes down due to a failure and reset control for the ball screw 725 is disabled, the braking operation performed by the driver is never hindered with the ball screw 725 reset to the initial position with the reaction force imparted by a return spring 728. Thus, it is ensured that the vehicle behavior never becomes destabilized by, for instance, brake drag.

A booster mechanism 801 includes two hydraulic pressure adjustment mechanisms 810*a* and 810*b* each installed to adjust the pressure of the hydraulic fluid for two wheels diagonal to each other among the four wheels. Thus, even if one of the hydraulic pressure adjustment mechanisms fails, the vehicle can be brought to a stop in a stable manner, and the braking forces at the wheel mechanisms 850*a* and 8509*b* for the two wheels diagonal to each other can be individually adjusted. Since the two hydraulic pressure adjustment mechanisms 810*a* and 810*b* are engaged in operation in a similar manner, the following description will focus on the operation of one of the mechanisms, i.e., the hydraulic pressure adjustment mechanism 810*a*. The hydraulic pressure adjustment mechanism 810*a* includes a gate OUT valve 811 via which supply of the hydraulic fluid to wheel cylinders 851 is controlled, a gate IN valve 812 via which fluid supply to pumps is controlled, IN valves 814*a* and 814*b* via which hydraulic fluid supply to the individual wheel cylinders 851 from the master piping 750*a* or the pumps is controlled, OUT valves 813*a* and 813*b* via which pressure reduction control for the wheel cylinders 851 is achieved, pumps 853 that boost master pressure generated with the hydraulic pressure from the master piping 750*a*, and pump motors 852 that drive the pumps 853. For instance, when executing hydraulic pressure control for purposes of antilock brake control, signals provided from wheel rotation sensors within the wheel mechanisms 850 are processed in the booster control unit 830 and, upon detecting that a wheel has been locked through braking, the corresponding IN/OUT valves (electromagnetic valves) and the pump are engaged in operation so as to adjust the hydraulic pressure to a level at which the wheel becomes unlocked. It is to be noted that this mechanism may be adopted in hydraulic pressure control executed for purposes of vehicle behavior stabilizing control, as well.

In the vehicle braking system structured as described above, the motor device is utilized to provide stable assistance at all times and also is utilized to control the displacement of the primary piston 726. For this reason, it needs to assure accurate detection of any abnormality as well as to be capable of operating continuously in a stable manner while sustaining a high level of accuracy. In addition, if the power charged in the battery 200 used as the power source becomes low, the extent of assistance that can be provided is bound to decrease. Under such circumstances, the braking assistance operation is continuously executed by using an auxiliary power source 400 as a power source in the system.

In an electric assistance-type braking system, in particular, the operation needs to be carried out uninterrupted even if the wiring at the battery 200, for instance, becomes disconnected, by switching to the auxiliary power source 400 for emergency backup operation. The auxiliary power source 400 is often designed so that only a relatively small current is provided in case of emergency and thus, the motor device must be engaged in operation in a power-saving mode with a smaller motor output so as to regulate the current accordingly during the emergency backup operation. Under such circumstances, the small current provided from the auxiliary power source 400 can be accurately detected as the input source current Isrc and, as a result, a braking system capable of generating a brake assistance force by controlling the maximum current value so as to sustain a substantially fixed value close to the limit value can be provided. Namely, the assistance control unit 706 according to the present invention is capable of providing the maximum extent of braking assistance force even in the event of battery failure.

It is to be noted that the present invention allows for the following variations.

While the DC bus current Idc may be detected by sampling the current on the PWM rising edge side and the PWM falling edge side for a total of four times within a single PWM cycle in (b) and (c) of FIG. 4, a motor current can be estimated as long as the DC bus current Idc can be determined in correspondence to two different voltage vectors, as has been explained earlier.

When the carrier cycle Tpwm (PWM cycle Tpwm) in (b) and (c) of FIG. 4 is sufficiently short in comparison to the inverter output frequency, an instantaneous value of the DC bus current detected on the PWM pulse rising edge side and an instantaneous value of the DC bus current detected on the PWM pulse falling edge side in correspondence to the same voltage vector are substantially equal to each other. For instance, an instantaneous value detected on the rising side in correspondence to the voltage vector V1 is equal to an instantaneous value detected on the falling side in correspondence to the voltage vector V1. For this reason, the motor current may be estimated based upon two instantaneous values (corresponding to V1 and V2) of the DC bus current on the PWM pulse rising edge side or based upon two instantaneous values (corresponding to V1 and V2) of the DC bus current on the PWM pulse falling edge side.

While the current flowing between the negative pole-side connection point 91 and the inverter circuit 130 is detected as the DC bus current Idc as in described above, the current flowing between the positive pole-side connection point 90 and the inverter circuit 130 instead may be detected as the DC bus current Idc.

While the input source current Isrc flowing between the battery 200 and the positive pole-side connection point 90 is estimated as in described above, the current flowing between the negative pole-side connection point 91 and the battery 200 may be estimated instead.

While instantaneous values are sampled over the continuous output time lengths (sampling periods) corresponding to two voltage vectors on the falling edge side as in described above, instantaneous values may be sampled over the continuous output time lengths corresponding to two voltage vectors on the rising edge side instead.

While a pulse shift is applied so as to extend the continuous output time lengths (sampling periods) corresponding to two voltage vectors on the falling edge side as in described above, a pulse shift may be applied instead so as to extend the continuous output time lengths corresponding to two voltage vectors on the rising edge side.

As long as the features characterizing the present invention are not compromised, the present invention is in no way limited to the particulars of the embodiments described above and other modes or combinations that are conceivable within the technical scope of the present invention are also within the scope of the invention.

What is claimed is:

1. An inverter device, comprising:
a positive pole-side terminal connected to a positive pole side of a power source;
a negative pole-side terminal connected to a negative pole side of the power source;
a three-phase inverter circuit connected to a motor to drive the motor;
a smoothing capacitor;
a positive pole-side connection point that electrically connects the positive pole-side terminal, the inverter circuit and the smoothing capacitor;
a negative pole-side connection point that electrically connects the negative pole-side terminal, the inverter circuit and the smoothing capacitor;
a PWM generator that generates three-phase PWM waves used to drive the inverter circuit;
a pulse shift unit that generates, based upon the PWM waves, a first command in response to which the PWM generator executes a pulse shift or a second command in response to which the PWM generator does not execute a pulse shift;
a current detector that detects a DC bus current that flows between the positive pole-side connection point and the inverter circuit or between the negative pole-side connection point and the inverter circuit as the inverter circuit is driven;
an arithmetic operation unit that calculates an average value of the DC bus current during a PWM cycle through arithmetic operation executed based upon instantaneous values of the DC bus current detected at predetermined time points occurring during continuous output periods corresponding to predetermined voltage vectors within the PWM cycle; and
an input source current estimating unit that provides an estimated value for an input source current flowing between the positive pole-side terminal and the positive pole-side connection point or between the negative pole-side terminal and the negative pole-side connection point during the PWM cycle by designating the average value of the DC bus current flowing through the PWM cycle as the estimated value; wherein:
the arithmetic operation unit includes a motor current estimating unit that estimates a motor current based upon instantaneous values of the DC bus current and the predetermined voltage vectors in correspondence to which the instantaneous values are detected;

the arithmetic operation unit eliminates current errors attributable to the pulse shift corresponding to the predetermined voltage vectors from the motor current so as to correct the motor current;

when the pulse shift is applied, the arithmetic operation unit calculates the average value of the DC bus current during the PWM cycle based upon the corrected motor current and pulse widths of the PWM waves corresponding to individual phases; and the current errors attributable to the pulse shift, which are contained in the motor current, are represented by instantaneous values of the DC bus current detected by the current detector when a pulse shift is executed by the PWM generator with PWM duty ratios corresponding to the individual phases equalized to one another.

2. The inverter device according to claim 1, wherein based upon the instantaneous values, the continuous output periods corresponding to the predetermined voltage vectors during which the instantaneous values are detected and a pulse shift amount representing an extent of pulse shift applied via the PWM generator, the arithmetic operation unit calculates the average value of the DC bus current during the PWM cycle when the pulse shift is applied.

3. The inverter device according to claim 1, wherein the inverter circuit is controlled based upon the estimated input source current.

* * * * *